April 3, 1962  R. A. FARRALL  3,028,499
EXPANDED SCALE PHOTOELECTRIC DEVICE
Filed Nov. 2, 1959

*INVENTOR.*
ROBERT A. FARRALL
BY
Irving M. Freedman
HIS ATTORNEY

United States Patent Office 3,028,499
Patented Apr. 3, 1962

3,028,499
EXPANDED SCALE PHOTOELECTRIC DEVICE
Robert A. Farrall, Beverly, Mass., assignor to General Electric Company, a corporation of New York
Filed Nov. 2, 1959, Ser. No. 850,357
8 Claims. (Cl. 250—209)

Photocells have electrical characteristics which vary in response to the level of light incident thereon and are frequently utilized to actuate electric instruments in exposure meters or in mechanisms which automatically regulate the lens opening or shutter speed of a camera in response to the level of illumination. Photocells may be of the photovoltaic or photoconductive type. The photovoltaic or self-generating type produces a D.C. voltage which varies in response to the incident light while the resistance of the photoconductive type varies inversely to the incident light.

However, photocells are inherently linear devices; that is, the change of electrical characteristic varies linearly as the level of incident light, particularly when the external circuit resistance is low. In exposure meters and other photographic devices it is desirable and common to obtain what is known as a log-linear deflection or output characteristic; that is, when the level of light doubles, the instrument or control mechanism should deflect a linear amount. In the past, it has been common practice to tailor the characteristics of the electric instrument to provide a logarithmic deflection versus input current characteristic such that the combination of the electric instrument and the linear photocell will provide the desired log-linear light-deflection characteristic. With such an arrangement, compensation for film speed, lens opening or shutter speed cannot be readily accomplished without complex mechanical arrangements or, as is common, shunting or masking of the photocell which decrease the sensitivity of the instrument photocell combination.

Logarithmic electric instruments provide problems of design and damping, particularly when such instruments are required to operate over an extended range of light values as is required for photographic instruments. In order to obtain a logarithmic deflection characteristic the magnetic flux of the electric instrument must decrease logarithmically over the deflection range. The required flux distribution is obtained by shaping and design of the permanent magnet and magnetic circuitry of the instrument such that a true logarithmic flux distribution characteristic becomes difficult to obtain in practice. As the instrument deflects the flux must recrease logarithmically and for extended ranges rapidly reaches a low value. The instrument damping varies as the square of the flux and is normally provided by the interaction of the fixed flux and the flux provided by the induced current flow through the instrument. Thus, the magnetic damping effect rapidly diminishes as the instrument deflects.

The problem of damping is accentuated in the automatic control of cameras or other devices since such control arrangements often include vanes or other control members of relatively high inertia coupled to the moving system of the electric instrument which adds considerably more inertia than provided by only a pointer associated with a scale, as is the case with an exposure meter. Because of size limitations, it has been found impractical to use auxiliary damping means such as damping vanes which cooperate with a magnet.

On the other hand, it is relatively simple to design a linear deflection electric instrument with good damping characteristics over the entire deflection range.

It is an object of this invention to provide a photocell circuit in which the current output varies logarithmically with the level of incident light.

It is a further object of this invention to provide a photocell circuit having a logarithmic light-current output characteristic which may be combined with a linear type of electric instrument to provide a combined log-linear light-deflection characteristic.

It is a still further object of this invention to utilize a photoconductive cell to tailor the output characteristics of a photovoltaic cell or a photoconductive cell in series with a battery so that the combined output characteristic will vary in a logarithmic manner with linear changes of incident light.

It is another object of this invention to provide a light responsive instrument having good damping characteristics and operable over a wide range of incident light values in a log-linear manner.

In accordance with one form of the invention, a log-linear type of photometric instrument is provided having an electric instrument with linear deflection versus current characteristics in combination with a photocell circuit having a logarithmic current versus light characteristic. The photocell circuit comprises a photovoltaic cell or a photoconductive cell in series with a battery as the detection cell and a photoconductive cell either in series with or in parallel with the detection cell to act as a shaping cell. Both cells are exposed to the same incident light which is being measured or used as a control function.

For a better understanding of this invention, reference may be had to the following description taken in connection with the accompanying drawings in which.

Figure 1:
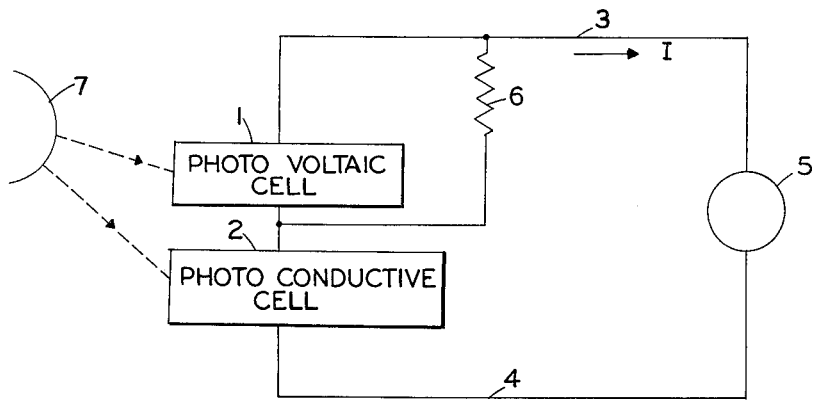
FIG. 1 is a schematic representation of one form of the invention.

Referring to FIG. 1, the photovoltaic cell 1 is connected in series with a photoconductive cell 2 and the end connections 3, 4, are connected to electrical responsive means such as microammeter 5.

The photovoltaic cell 1 may be of a conventional type such as silicon or selenium barrier layer cell although the selenium barrier layer cell has been found to be desirable. The photo-conductive cell 2 may be of a conventional type such as cadmium sulphide or cadmium selenide although cadmium sulphide has been found to be desirable. The microammeter 5 is designed to have a linear deflection characteristic; that is, the deflection of the moving system in response to current flow is directly proportional to the magnitude of the current flow.

The voltage produced by photovoltaic cell 1 is proportional to the level of the incident light from source 7 and the deflection of the linear electric instrument 5 would also be proportional to the level of the incident light if it were not for the influence of photoconductive cell 2. Photoconductive cell 2 is subjected to the same incident light as photovoltaic cell 1 and the resistance thereof varies inversely as the magnitude of the incident light such that the current flow I depends upon the combined characteristic of cells 1 and 2. To further tailor the output characteristics of photovoltaic cell 1, a shunt resistor 6 may be connected across the photovoltaic cell.

While it is known to tailor the output characteristic of a photocell by using fixed resistance loading on the cell, and it is possible to obtain a logarithmic characteristic over a limited range of incident light levels, such an arrangement will not provide a logarithmic characteristic over a wide range, for example, from 0.1 foot candle to 1000 foot candles. Such wide ranges of operation are desirable and/or required for present day photographic apparatus. In order to tailor the photovoltaic cell 1 characteristic over a wide range it is necessary to vary the loading of the photovoltaic cell inversely as the light level with a very high resistance being required at low levels of incident light and a relatively low resistance at high levels of incident light. The photoconductive cell 2 furnishes the required light sensitive variable load.

Therefore, while the photocells 1 and 2 are each in themselves inherently linear devices, particularly at low circuit resistances, proper selection of the characteristics of the two in combination will provide current flow I which varies logarithmically as the level of the incident light from light source 7.

Since the electrical characteristics of the microammeter 5 are determined by the instrument; that is, the magnitude of current I required for a given deflection is known, it is possible to determine the resistance characteristic of the photoconductive cell 2 required for any photovoltaic cell 1 in the following manner. A decade resistance box or other suitable variable resistance may be substituted for photoconductive cell 2 and the resistance varied to determine that required at each desired light level over the operating range. The photoconductive cell 2 may then be selected and fabricated to provide the required resistance at each desired light level.

It has been found that by shaping the characteristics of photocell 2 photometric instruments can be designed to properly operate over a wider range than is possible through use of a linear photocell and logarithmic instrument combination. It should be appreciated that through proper selection of the photocells and shunt resistor 6 it is possible to realize almost any type of deflection characteristic in that the output current I can be made to vary in response to the incident light in either a logarithmic, linear, or some intermediate manner.

Figure 2:
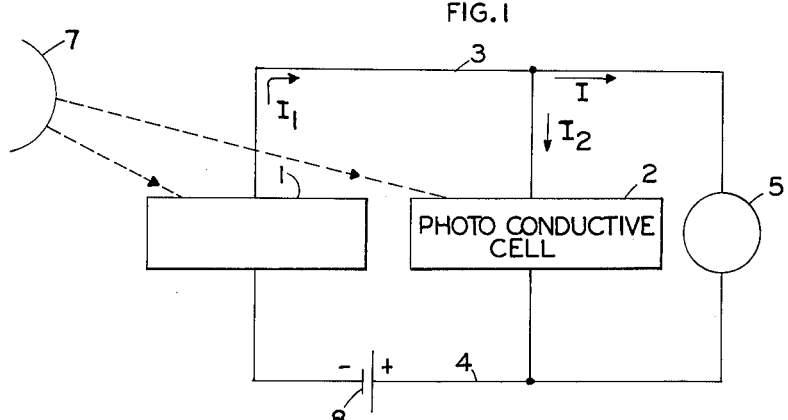
FIG. 2 is a schematic representation of an alternate embodiment of the invention.

FIG. 2 illustrates an alternate embodiment of the invention in which the photocells are connected in parallel rather than in series. Corresponding numerals are used for parts which correspond to those of FIG. 1. Referring to FIG. 2, it will be seen that the photoconductive cell 2 shunts the electric instrument 5 and is in turn shunted by photocell 1 and battery 8. Photocell 1 and battery 8 represent a photovoltaic cell or a photoconductive cell in series with a battery, either of which will provide an output current $I_2$ which varies in accordance with the level of incident light from light source 7. The current I which reaches the electric instrument 5 through conductors 3 and 4 will vary in accordance with the combined characteristic of photocells 1 and 2 since photoconductive cell 2 shunts a portion of the current I, $I_2$, from the instrument 5. Thus, the current I is determined by the combined characteristics of photocells 1 and 2 and can be made to vary logarithmically with the level of incident light through a proper selection of the photocells.

In a manner similar to that described above in regard to FIG. 1, the characteristics of the photoconductive or shaping cell 2 may be conveniently determined. Due to the complex nature of the characteristics of photovoltaic cells, it has been found that empirical methods of determining the resistance characteristic of cell 2 are convenient and accurate when cell 1 is of the photovoltaic type.

If cells 1 and 2 are both of the photoconductive type, the resistance characteristic of the shaping cell 2 may be calculated through use of the following relationship:

$$R_2 = \frac{IR_5 R_1}{E_s - IR_1 - IR_5}$$

Figure 3:
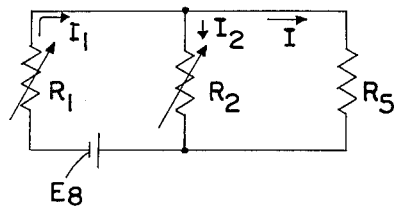
FIG. 3 illustrates an equivalent circuit for that shown in FIG. 2.

FIG. 3 is an equivalent circuit of FIG. 2 and may prove useful in understanding and using the above relationship.

An important advantage obtained with the circuit of FIG. 2 is a self-compensating action of the photocells 1 and 2. Photocells have characteristics which are affected by environmental factors such as humidity and temperature. Also, photocells tend to age over a period of time.

In the circuit of FIG. 2 the photocells 1 and 2 automatically compensate for environmental and aging effects to which they are both subjected. For example, if at any fixed level of incident light the resistance of cell 1 should decrease due to a change in the ambient temperature, the resistance of cell 2 will also decrease. When the resistance of photocell 1 decreases the current $I_1$ will increase and tend to provide an incorrect response of instrument 5. However, since photocell 2 is subjected to the same environmental factors as cell 1, the resistance of photocell 2 will also decrease, shunting additional current $I_2$ from the instrument 5 to maintain the current I substantially constant at the level of light intensity. While the above description assumes a fixed level of incident light to facilitate an explanation of the compensating action, the compensating action will take place even during changes of light levels.

In order to enhance the compensating effect, it has been found desirable to construct both cells 1 and 2 on the same substrate or supporting structure. Such a construction is shown in FIG. 4.

Figure 4:
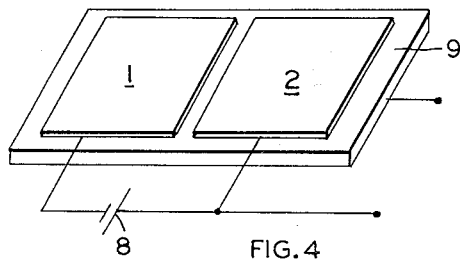
FIG. 4 illustrates a preferred construction in which the two photocells are formed upon a single substrate.

Referring to FIG. 4, it will be seen that cells 1 and 2 may be conveniently formed upon a common base or electrode 9. Such a construction insures that the cells will be physically close together to be subjected to the same incident light and environmental factors. Furthermore, the common base 9 may be utilized as a common electrical connection between the cells minimizing the number of external electrical connections needed for the circuit.

If the photocell 1 of the circuit of FIG. 2 is of the photoconductive type, the desired output versus light characteristic of the photocell circuit-electric instrument combination over a wide range is provided principally by the characteristic of the photocell circuit. The resistance of the electric instrument becomes less critical than in prior art arrangements in which the resistance was determined in part by the required tailoring of the characteristic to be provided by the instrument. Thus, a microammeter 5 having a high resistance and an armature having a large number of turns may be used to provide increased sensitivity over the initial portion of the operating range.

Also, it should be noted that the photoconductive or shaping cell 2 acts as a variable impedance shunt and the circuit sensitivity may be varied for different film speeds or other exposure variables by masking the cell area or moving a neutral density filter over the cell.

However, since the electric instrument 5 has a linear deflection characteristic, the instrument may be accurately and readily constructed to exhibit desirable deflection and damping characteristics while facilitating adjustments for variables such as film speed, lens opening, or shutter speed. Such adjustments may be conveniently accomplished with a linear instrument by merely indexing the scale associated with the instrument or the control reference point if the device is utilized as a control arrangement.

Therefore, while particular embodiments of the subject invention have been shown and described herein, they are in the nature of description rather than limitation, and it will occur to those skilled in the art that various changes, modifications, and combinations may be made within the province of the appended claims without departing either in spirit or scope from this invention in the broader aspects.

What I claim as new and desire to secure by Letters Patent of the United States is:

1. In a photoelectric exposure device of the type which provides an output deflection which varies in accordance with the level of illumination, a first photocell to provide an output current in accordance with the level of illumination thereon, deflection means responsive to said current, and a second photocell in circuit with said first photocell and subjected to said illumination, said second photocell being of the photoconductive type and modifying the current versus light characteristic and magnitude of the output current provided to said deflection means by said first photocell, said photocells providing variations of electrical characteristics with variations of level of illumination which combine to provide a substantially logarithmic current versus light output, and said current responsive means being of the type to provide deflections which are substantially linear with respect to said current, whereby said deflections vary substantially logarithmically with said level of illumination.

2. In a photoelectric exposure device of the type which provides an output deflection which varies in accordance with the level of illumination, a first photocell of the photovoltaic type to provide an output current in accordance with the level of illumination thereon, deflection means linearly responsive to said current, and a second photocell in circuit with said first photocell and subjected to said illumination, said second photocell being of the photoconductive type, said photocells having electrical characteristics and resultant output current which vary in accordance with said illumination and which in combination provide a logarithmic current versus light characteristic, whereby said deflections vary substantially logarithmically with said level of illumination.

3. In a photoelectric exposure device of the type which provides an output deflection which varies in accordance with the level of illumination, a photovoltaic cell to provide an output current in accordance with the level of illumination thereon, a second photocell in series with said first cell and subjected to said illumination, said second photocell being of the photoconductive type and modifying the current versus light characteristic of said first photocell, and current responsive deflection means in circuit with said photocells, said photocells providing variations of electrical characteristics with variations of level of illumination which combine to provide a substantially logarithmic current versus light output, and said current responsive means being of the type to provide deflections which are substantially linear with respect to said current, whereby said deflections vary substantially logarithmically with said level of illumination.

4. In a photoelectric exposure device, a photovoltaic cell to provide an output current in accordance with the level of illumination thereon, a second photocell in parallel with said first cell and subjected to said illumination, said second photocell being of the photoconductive type and modifying the current versus light characteristic of said first photocell, and current responsive deflecting means in circuit with said photocells, said photocells being selected to provide variations of electrical characteristics with variations of level of illumination which combine to provide a substantially logarithmic current versus light output, and said current responsive means being of the type to provide deflections which are substantially linear with respect to said current, whereby said deflections vary substantially logarithmically with said level of illumination.

5. In a photoelectric device, a photovoltaic cell to provide an output current in accordance with the level of illumination thereon, a second photocell in parallel with said first cell and subjected to said illumination, said second photocell being of the photoconductive type and modifying the current versus light characteristic of said first photocell, and current responsive deflecting means in circuit with said photocells, said first and second photocells being formed upon a single substrate and including a common electrode, whereby said cells in combination are self-compensating for the effects of environmental factors including humidity and temperature.

6. In a photoelectric exposure device, a direct current circuit comprising: a first photoconductive photocell in series with a battery to provide an output current in accordance with the level of illumination thereon, deflection means responsive to said current, a second photoconductive photocell in parallel with said first photocell and battery and subjected to said illumination, said photocells providing variations of electrical characteristics with variations of level of illumination which combine to provide a substantially logarithmic current versus light output, and said current responsive means being of the type to provide deflections which are substantially linear with respect to said current, whereby said deflections vary substantially logarithmically with said level of illumination.

7. In a photoelectric exposure device, a direct current circuit comprising: a first photoconductive photocell in series with a battery to provide an output current in accordance with the level of illumination thereon, deflection means responsive to said current, a second photoconductive photocell in parallel with said first photocell and battery and subjected to said illumination, said second photocell in combination with said first photocell providing a non-linear current versus light characteristic, said first and second photocells being formed upon a single substrate and including a common electrode, whereby said cells in combination are self-compensating for the effects of environmental factors including humidity and temperature, and a current responsive means in circuit with said photocells to provide an output deflection which varies substantially linear with respect to said current whereby said deflections vary nonlinearly with said level of illumination.

8. In a photoelectric exposure device, a direct current circuit comprising: a first photoconductive photocell in series with a battery to provide an output current in accordance with the level of illumination thereon, deflection means linearly responsive to said current, a second photoconductive photocell in parallel with said first photocell and battery and subjected to said illumination, said second photocell in combination with said first photocell providing a non-linear current versus light characteristic, said first and second photocells being formed upon a single substrate and including a common electrode, and means to selectively control the level of illumination reaching said second photocell, whereby said cells in combination are self-compensating for the effects of environmental factors including humidity and temperature, and a current responsive means in circuit with said photocells to provide an output deflection which varies substantially linear with respect to said current whereby said deflections vary nonlinearly with said level of illumination.

References Cited in the file of this patent
UNITED STATES PATENTS

| | | |
|---|---|---|
| 2,132,254 | Becker | Oct. 4, 1938 |
| 2,482,980 | Kallmann | Sept. 27, 1949 |
| 2,743,430 | Schultz et al. | Apr. 24, 1956 |